Dec. 21, 1954  F. E. CUE  2,697,458
BACK EXTENSION FOR CIRCULAR SAW MACHINE TABLES
Filed Oct. 22, 1953
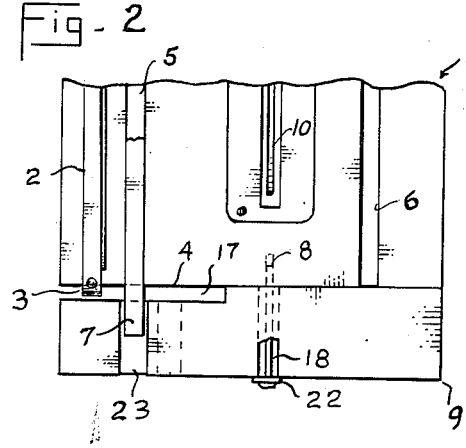
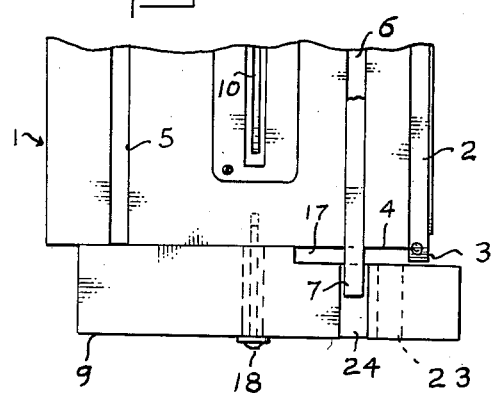
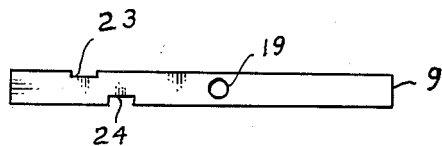
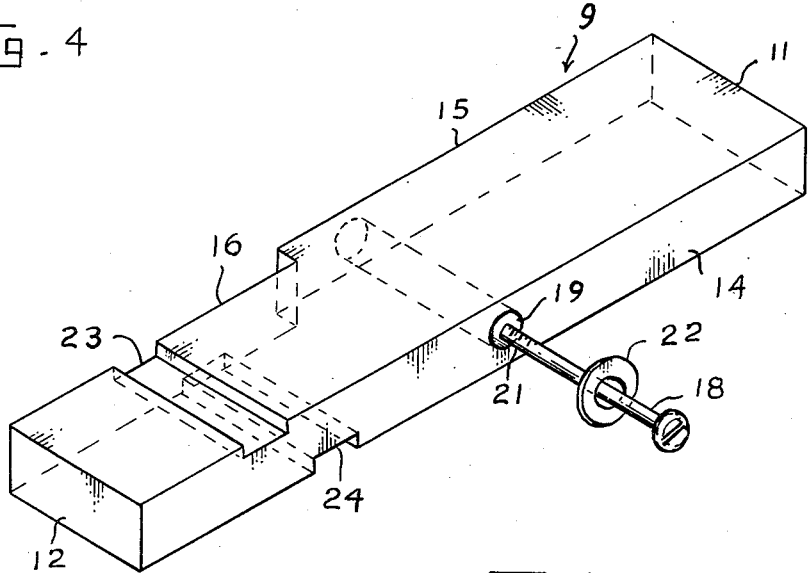
INVENTOR.
FRANK E. CUE
BY Nicholas J. Garofalo
ATTORNEY ical and economical means for extending the back edge of a circular saw machine table.

United States Patent Office 2,697,458
Patented Dec. 21, 1954

2,697,458
BACK EXTENSION FOR CIRCULAR SAW MACHINE TABLES

Frank E. Cue, Hollis, N. Y.

Application October 22, 1953, Serial No. 387,755

4 Claims. (Cl. 143—132)

This invention relates to new and useful improvements in circular saw machine tables, and it is particularly concerned with a device for extending the length of the back portion of the table beyond the saw blade.

The invention finds particular use with those circular saw machine tables, such as the well known Shopsmith type, wherein the location of the fence on the table is adjustable to a plurality of positions, and is securable in its adjusted position by means of a back lock on the fence, which lock overhangs the back side of the table. In tables of this type the fence may be located in any desired position either to the right or the left of the blade face. It is secured in this selected location by tightening the back lock. The latter overhangs the back side of the table and, for this reason, provides an obstruction which has made it difficult to provide suitable means for extending the back portion of the table. This difficulty has been further increased by the obstruction created by the miter gauge runner when the latter is moved in its conventional slots and passed beyond the back edge of the table.

The size of the work table of circular saw machines is, for understandable reasons, limited and small, accessories being sold for extending the table at the front and sides thereof. It is, however, desirable that a practical and efficient means be provided for extending the table at the rear thereof. This is desirable so as to accommodate lengths of stock that are moved for substantial distances beyond the back edge of the table after leaving the saw blade. Where such stock is used, the unsupported weight of the overhanging portion lifts the front end thereof and causes a poor cut as well as a dangerous condition. Often in such cases the operator extends his hand around the back of the table to support the overhanging stock, and at times hunches himself as he does so. This action subjects the operator to the dangers of the saw blade and possible injury.

Now, I have invented an accessory for extending the back portion of a circular saw machine table and providing a practical, safe and economical solution to the various problems and difficulties presented. The invention may be used in extending the rear portion of the table, regardless of the overhanging fence lock and regardless of whether the fence is used on the right or left side of the saw blade. The invention may be applied and used without interfering with the proper use of the miter gauge runner, whether the latter is used in a runner slot to the left or the right of the saw blade. Further, the versatile nature of the invention permits its use with or without the saw blade guard.

A general object of the invention is, therefore, a practical and economical means for extending the back edge of a circular saw machine table.

A further object of the invention is to provide a practical means for extending the back edge of a circular saw machine table of the type that includes a fence having an overhanging back lock and guide slots wherein the runner of a miter gauge is adapted to move beyond the back edge of the table.

The invention further lies in the particular construction and arrangement of its various elements, as well as in their cooperative association with the back side of a circular saw machine table.

In the drawings, wherein a back extension is shown embodying the invention:

Fig. 1 is a perspective view thereof;

Fig. 2 is a top plan view showing the device in association with a circular saw machine table, wherein the left side of the table is fenced and the left miter gauge runner slot is being used.

Fig. 3 is a plan view of the reverse side of the device and illustrating its use with the right side of the table; and, Fig. 4 is a front elevational view of the device, drawn to a smaller scale than is shown in Fig. 1.

In describing the invention in detail, there is disclosed in the drawings the rear or back portion of a conventional circular saw machine table 1 on which there is mounted a fence 2 having a back lock 3 which overhangs the back side 4 of the table. In the surface of the table and extending through the back edge thereof are conventional miter runner slots 5 and 6. The slots are located one to either side of the face of the blade and in parallel spaced relation thereto. One of the slots, here slot 5, is spaced a greater distance from the face of the blade than the other. The slots serve as guides for the runner 7 of a miter gauge. The runner is adapted to pass through the back edge of the slot and beyond the table upon a rearward adjustment of the miter gauge.

In the back side 4 of the table is a threaded hole 8 in direct line with the cutting edge of the blade. This hole is adapted to accommodate a thin washer-like portion of a bracket on which the conventional saw guard pivots.

The means for extending the back portion of the table is provided by a block, generally designated 9. The block is of rectangular proportions and includes right and left sides 11 and 12, a rear side 14, and a front side 15 in parallel relation to the latter side. The front side 15 is adapted to abut against the back side of the table and is provided with a reduced stepped portion 16 which provides a space 17 between it and the back side of the table. Space 17 is sufficiently wide enough to freely accommodate the overhanging portion of the back lock of the fence. The block 9 is adapted to be held with its front side 15 in abutment with the table side by suitable fastening means. The latter is provided by a bolt 18 which is adapted to pass through a hole 19 of the block and is provided with a threaded end 21 adapted to engage in the table side hole 8. The bolt hole 19 extends from the rear side of the block through to the front side thereof. The length of the block is substantially equal to the width of the table, and the bolt hole 19 is located at a point where it will be in alignment with the table side hole 8, when the block is positioned against the table with the stepped portion on the left, as in Fig. 2.

The block is of a thickness equal to that of the table so that when fastened to the latter the surface of the block will be flush with the table surface. So as to accommodate tables that may differ slightly from the thickness of the block, the hole 19 through the latter is of a greater diameter than that of the bolt. This enables the block to be raised or lowered slightly to a level with the table surface. A suitable washer 22 is provided to prevent the block from slipping free of the bolt head.

Block 9 also includes a channel or slot 23 across its upper surface. When the block is positioned as in Fig. 2 this slot 23 is aligned with the runner slot 5 in the left portion of the table. Slot 23 is adapted to receive the runner 7 when the latter is moved beyond the table edge, and slot 23 is of a depth equal to the thickness of the runner so that the upper surface of the latter will be flush with that of the block. The block slot 23 is slightly wider than the table slot so that, if necessary, it may accommodate runners of different widths.

The stepped portion 16 of the block is of ample length so as to provide a space 17 sufficient to accommodate the fence back lock in any of its adjustable positions to the left of the saw blade.

The back extension block 9 also serves to accommodate the fence lock and miter gauge runner when these are employed on the right side of the table. To this end, the fence and gauge are first removed from the left side of the table, then the fastening bolt 18 is loosened and the block is pivoted clockwise so that the stepped portion 16 and the formed space 17 will be on the right side of the table. This action will also bring to a top position a second slot 24 which is on the reverse side of the block. This slot 24 is in all respects similar to the other block slot 23, but is located in the block in a position where it will receive the miter gauge runner when the runner slot in the right portion of the table is used. The fastening bolt 18 is then tightened as before so as to hold the block extension to the back side of the table. The space 17 formed when the stepped portion is on the right will also accommodate the back lock in the various adjusted positions of the fence on the right portion of the table.

The extension piece 9 may come in various widths together with a suitable size fastening bolt to secure it to the table. A desirable width is about four inches. With this width the extension block may be used with or without the saw guard in position. When the saw guard is used, the conventional bracket for that purpose is used in place of the washer 22.

The extension block may be fashioned of wood, metal, plastic or any other firm material.

While I have described and illustrated my invention as above, it is my intention, however, to claim the invention not only as shown and described but also in all such forms and modifications thereof as may be reasonably construed to be within the spirit of the invention and the scope of the appended claims.

I claim:

1. In the combination with a circular saw machine table having a fence with a back lock that overhangs the back side of the table, of a broad flat surfaced block having a side face adapted to abut against a portion of the back side of the table, the block having an elongated reduced portion stepped in from said side face and adapted to provide a space between itself and the back side of the table when the side face of the block abuts the table back side, the space being adapted to freely receive the overhanging back lock, wherein the fence is adjustable to a plurality of positions across the table, in each of which positions the back lock overhangs the back side of the table, means for securing the block against the back side of the table in either of two positions, in one of which positions the space provided is along the left portion of the table and in the other position is along the right portion of the table, the space when in one of said positions being adapted to accommodate the back lock in some of its positions along the back side of the table, and the space when in the other position being adapted to accommodate the back lock in the rest of its positions.

2. In the combination as in claim 1, wherein the securing means is characterized by a bolt through the central transverse area of the block that is engageable with a hole in the back side of the table.

3. An extension block of the character described, comprising a front and a rear side, a narrow portion stepped in from the front side, a slot across opposite faces of the narrow portion, and pivot means adapted to secure the block to a circular saw machine table of the character described, the block being selectively pivotable on said means to bring the stepped portion of the block and one slot to the right portion of the table, or to bring the stepped portion of the block and the other slot to the left portion of the table.

4. An extension block for the back side of a circular saw machine table including a broad portion having one side adapted to engage against the back side of the table, a reduced portion stepped in from the broad portion adapted to form a space between itself and the back side of the table, a slot across the upper surface of the reduced portion alignable with a runner slot of the table, a slot across the undersurface of the table alignable with a second runner slot of the table, and means for pivotably securing the block to the table back side.

References Cited in the file of this patent

UNITED STATES PATENTS

| Number | Name | Date |
| --- | --- | --- |
| 1,938,548 | Tautz | Dec. 5, 1933 |
| 1,938,549 | Tautz | Dec. 5, 1933 |
| 2,075,282 | Hedgpeth | Mar. 30, 1937 |
| 2,677,400 | Gaskell | May 4, 1954 |